United States Patent
Maeda et al.

(10) Patent No.: US 7,358,323 B2
(45) Date of Patent: Apr. 15, 2008

(54) WATER-SOLUBLE FLAME-RETARDANT POLYESTER RESIN, RESIN COMPOSITION CONTAINING THE RESIN, AND FIBER PRODUCT TREATED WITH THE RESIN COMPOSITION

(75) Inventors: Koji Maeda, Uji (JP); Kouichi Ikegami, Funai-gun (JP)

(73) Assignee: Goo Chemical Co., Ltd., Kyoto (JP)

( * ) Notice: Subject to any disclaimer, the term of this patent is extended or adjusted under 35 U.S.C. 154(b) by 0 days.

(21) Appl. No.: 10/523,526

(22) PCT Filed: Feb. 10, 2003

(86) PCT No.: PCT/JP03/01403

§ 371 (c)(1),
(2), (4) Date: Feb. 4, 2005

(87) PCT Pub. No.: WO2004/014983

PCT Pub. Date: Feb. 19, 2004

(65) Prior Publication Data

US 2005/0261461 A1    Nov. 24, 2005

(30) Foreign Application Priority Data

Aug. 7, 2002   (JP) .............................. 2002-230506

(51) Int. Cl.
C08G 63/68    (2006.01)
B32B 27/06    (2006.01)

(52) U.S. Cl. ............... 528/287; 528/295; 528/296; 528/302; 528/308; 528/308.6; 428/364; 428/480

(58) Field of Classification Search ............... 528/287, 528/295, 296, 302, 308, 308.6; 428/364, 428/480
See application file for complete search history.

(56) References Cited

U.S. PATENT DOCUMENTS

| | | | |
|---|---|---|---|
| 4,098,741 A | 7/1978 | Login | |
| 4,179,420 A * | 12/1979 | Laganis | 524/598 |
| 4,314,052 A | 2/1982 | Engelhardt et al. | |
| 4,476,189 A * | 10/1984 | Posey et al. | 428/336 |
| 4,515,863 A | 5/1985 | Caines | |
| 5,422,227 A | 6/1995 | Hotta et al. | |
| 5,530,093 A | 6/1996 | Engelhardt et al. | |
| 5,614,573 A * | 3/1997 | Sano et al. | 524/121 |
| 5,935,684 A * | 8/1999 | Handa et al. | 428/141 |
| 6,469,078 B1 | 10/2002 | Simon et al. | |
| 6,498,227 B1 * | 12/2002 | Horie | 528/176 |

FOREIGN PATENT DOCUMENTS

| | | | |
|---|---|---|---|
| EP | 0652241 | | 5/1995 |
| EP | 1 054 031 | | 11/2000 |
| JP | 55-5938 | * | 1/1980 |
| JP | 56150813 A | * | 11/1981 |
| JP | 58-027741 | | 2/1983 |
| JP | 61037815 A | * | 2/1986 |
| JP | 02-175751 | | 7/1990 |
| JP | 06-016796 A1 | | 1/1994 |
| JP | 07-109621 A1 | | 4/1995 |
| JP | 54-003848 | * | 1/1997 |
| JP | 10-46474 | | 2/1998 |
| JP | 2000-129204 | | 5/2000 |
| JP | 2001-139784 A1 | | 5/2001 |
| JP | 2001-163962 A1 | | 6/2001 |

OTHER PUBLICATIONS

International Search Report for PCT/JP2003/001403 mailed on Apr. 15, 2003.
European Search Report dated Apr. 18, 2006.

* cited by examiner

Primary Examiner—Irina S Zemel
(74) Attorney, Agent, or Firm—Cheng Law Group PLLC

(57) ABSTRACT

A water-soluble, flame retardant polyester resin is obtained by a condensation reaction or a polycondensation reaction of a dicarboxylic-acid component, a glycol component, a water-solubility imparting component and a reactive phosphorus-containing compound such that a ratio of the water-solubility imparting component in a total of the dicarboxylic-acid component and the water-solubility imparting component is in a range of 1 to 60 mol %. Since this polyester resin can be dissolved in a solvent by allowing a halogen-free, phosphorus-containing polyester with excellent flame resistance to have water solubility, it is possible to improve applicability and eliminate problems of working environment and environmental destruction resulting from organic solvents. In addition, even when treating substrates such as fibers and PET films with the polyester resin, there is no deterioration of these substrates.

16 Claims, No Drawings

WATER-SOLUBLE FLAME-RETARDANT POLYESTER RESIN, RESIN COMPOSITION CONTAINING THE RESIN, AND FIBER PRODUCT TREATED WITH THE RESIN COMPOSITION

TECHNICAL FIELD

The present invention relates to a water-soluble, flame retardant polyester resin, which can be dissolved or dispersed in an aqueous solvent and contains phosphorus to obtain flame resistance, a resin composition containing the polyester resin, and a fiber product treated with the resin composition.

BACKGROUND ART

Polyester resins with excellent mechanical and chemical properties have been widely used in various applications of, for example, fibers for clothes, electromagnetic storages such as electromagnetic tapes and flexible disks, photographs, electrical insulation, cable lapping, capacitors, deposition, adhesive tapes, printer ribbons, magnetic cards, mold releasing for FRP, packaging, agricultures and so on.

By the way, from the viewpoint of guarding against fires, requests of allowing synthetic fibers or various plastic products to have flame resistance are increasing in recent years. However, conventional polyester resins still have plenty of room for improvement in the flame resistance. Due to this reason, it was proposed to add a flame retardant agent represented by a halogenated organic compound or an antimony compound at the time of polyester production.

However, there is a problem that these flame retardant agents exhale poisonous gases when contacting fire. To solve this problem, it was also proposed to add a hydrated metal compound such as aluminum hydroxide and magnesium hydroxide. However, it is needed to add a large amount of the hydrated metal compound to sufficiently improve the flame resistance. In this case, there is a fear of losing or deteriorating original excellent properties of polyester resins.

To solve these problems, it was proposed to add or copolymerize a phosphorus compound as the flame retardant agent at the time of polyester production. For example, Japanese Patent Early Publications [kokai] No. 6-16796, No. 2001-139784, and No. 2001-163962 disclose methods of copolymerizing a specific phosphorus compound with a polyester resin.

These phosphorus-containing polyester resins are often hard to dissolve in a general-purpose organic solvent such as toluene and xylene. Therefore, an extremely low polymerization degree is needed to obtain a solution or a dispersion liquid of the phosphorus-containing polyester resin used to treat PET films and fibers with the general-purpose organic solvent. However, in this case, there is a problem that it becomes difficult to keep the original properties of polyester resin.

Therefore, it is desired to develop a resin having the capability of exhibiting an improved applicability in the substrate treatment for fibers and PET films, while maintaining a high polymerization degree of the phosphorus-containing polyester resin to keep the original properties of polyester resin. To satisfy this requirement, when using an organic solvent with high solubility such as dioxane, DMF, HFIP and OCP, there are problems of poor working environment and environmental destruction. In addition, the use of these organic solvents induces another problem of deteriorating the substrates such as fibers and PET films. Since the phosphorus-containing polyester resin is not dispersed or dissolved in water, an aqueous solvent cannot be used as the solvent.

SUMMARY OF THE INVENTION

Therefore, a primary concern of the present invention is to provide a water-soluble, flame retardant polyester resin, which has the capability of providing improved applicability by allowing a halogen-free, phosphorus-containing polyester with excellent flame resistance to have a solubility in an aqueous solvent, eliminating problems of poor working environment and environmental destruction resulting from organic solvents, and also preventing deteriorations of worked substrates such as fibers and PET films even when they are treated with the polyester resin.

That is, the water-soluble, flame retardant polyester resin of the present invention is characterized in that it is prepared by a condensation reaction or a polycondensation reaction of a dicarboxylic-acid component, a glycol component, a water-solubility imparting component and a reactive phosphorus-containing compound such that a ratio of the water-solubility imparting component in a total of the dicarboxylic-acid component and the water-solubility imparting component is in a range of 1 to 60 mol %.

According to the water-soluble, flame retardant polyester resin, since a solubility or dispersibility in an aqueous solvent and excellent flame resistance are obtained without deteriorating original excellent properties of polyester resin, it is possible to carry out a water-based treatment under improved working condition and environmental protection.

A further concern of the present invention is to provide a resin composition containing the above-mentioned water-soluble, flame retardant polyester resin, and particularly the resin composition for forming a film with excellent flame resistance. This resin composition is preferably used in resin finishing of fiber products to provide excellent flame resistance and fire resistance to the fibers to be treated. Furthermore, when using the resin composition in a surface treatment of polyester films, it is possible to provide excellent flame resistance and fire resistance to the polyester films.

Another concern of the present invention is to provide a fiber product treated with the above-described resin composition. This fiber product has a film of the resin composition having excellent flame resistance and good film properties.

These and further purposes and advantages of the present invention will be clearly understood from the best mode for carrying out the invention described below.

BEST MODE FOR CARRYING OUT THE INVENTION

Preferred embodiments of a water-soluble, flame retardant polyester resin, resin composition containing the resin, and a fiber product treated with the resin composition are explained in detail below.

As described above, the water-soluble, flame retardant polyester resin of the present invention is prepared by a condensation reaction or a polycondensation reaction of a dicarboxylic-acid component, a glycol component, a water-solubility imparting component and a reactive phosphorus-containing compound such that a ratio of the water-solubility imparting component in a total of the dicarboxylic-acid component and the water-solubility imparting component is in a range of 1 to 60 mol %. Materials corresponding to the water-solubility imparting component and the reactive phosphorus-containing compound are not included in the dicarboxylic-acid component and the glycol component.

As the dicarboxylic-acid component that is one of the components constructing the water-soluble, flame retardant polyester resin of the present invention, for example, it is possible to use a dicarboxylic acid such as an aromatic dicarboxylic acid and an aliphatic dicarboxylic acid. As the aromatic dicarboxylic acid, for example, it is possible to use terephthalic acid, isophthalic acid, phthalic acid, diphenic acid, naphthalic acid, 1,2-naphthalenedicarboxylic acid, 1,4-naphthalenedicarboxylic acid, 1,5-naphthalenedicarboxylic acid, or 2,6-naphthalenedicarboxylic acid. On the other hand, as the aliphatic dicarboxylic acid, for example, it is possible to use a straight-chain, branched or alicyclic oxalic acid, malonic acid, succinic acid, maleic acid, itaconic acid, glutaric acid, adipic acid, pimelic acid, 2,2-dimethylglutaric acid, suberic acid, azelaic acid, sebacic acid, dodecandioic acid, 1,3-cyclopentanedicarboxylic acid, 1,4-cyclohexanedicarboxylic acid, diglycolic acid or thiodipropionic acid.

In addition to the above-described dicarboxylic acids, the dicarboxylic component comprises a derivative of dicarboxylic acid such as a halide, acid chloride, ester and an anhydride thereof, which has the capability of forming an ester by reacting with the glycol component described later, that is, an ester-forming derivative of dicarboxylic acid.

In these compounds, it is preferred to use the aromatic dicarboxylic acids such as terephthalic acid, isophthalic acid, 2,6-naphthalenedicarboxylic acid, or the aliphatic dicarboxylic acids such as succinic acid, adipic acid, sebacic acid and dodecandioic acid from the viewpoints of easiness of reaction, weather resistance and durability of the resin obtained. In particular, it is preferred to use the aromatic dicarboxylic acids by itself, or as the main component.

As the glycol component that is one of the component constructing the water-soluble, flame retardant polyester resin of the present invention, for example, it is possible to use ethylene glycol, polyethylene glycol such as diethylene glycol, triethylene glycol, tetraethylene glycol, pentaethylene glycol, hexaethylene glycol, heptaethylene glycol and octaethylene glycol, propylene glycol, polypropylene glycol such as dipropylene glycol, tripropylene glycol and tetrapropylene glycol, 1,3-propanediol, 1,3-butanediol, 1,4-butanediol, 1,5-pentanediol, 1,6-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-dihydroxybiphenol, 4,4'-methylenediphenol, 4,4'-isopropylidenediphenol, 1,5-dihydroxynaphthalene, 2,5-dihydroxynaphthalene, 2,2-bis(4-hydroxyphenyl)propane(bisphenol A), or bisphenol S.

In addition to the above-described glycols, the glycol component comprises a derivative of glycol such as diacetate compounds corresponding to these glycols, which has the capability of forming an ester by reacting with the above-described dicarboxylic acid component, that is, an ester-forming derivative of glycol.

Each of these glycol components may be used by itself, or a combination of two or more thereof may be used. In these compounds, it is particularly preferred to use ethylene glycol, diethylene glycol, the butanediols such as 1,4-butanediol, the hexanediols such as 1,6-hexanediol, 1,4-cyclohexanedimethanol, neopentylglycol, or bisphenol A from the viewpoints of easiness of reaction and durability of the resin obtained.

The water-solubility imparting component that is one of the components constructing the water-soluble, flame retardant polyester resin of the present invention reacts with at least one of the dicarboxylic acid component and the glycol component described above to provide a part of a skeleton structure of the water-soluble, flame retardant polyester resin. In addition, since an ionic polar group resulting from the water-solubility imparting component is introduced in the skeleton structure, hydrophilicity is imparted to the water-soluble, flame retardant polyester resin. As a result, this water-soluble, flame retardant polyester resin can be dispersed or dissolved in an aqueous solvent.

As such a water-solubility imparting component, for example, it is possible to use a dicarboxylic acid component having a metal sulfonate group or a polyvalent (trivalent or more) carboxylic acid component such as a tribasic acid anhydride and a tetrabasic acid anhydride.

As the dicarboxylic acid component having the metal sulfonate group, for example, it is possible to use an alkali metal salt such as 4-sulfonaphthalene-2,6-dicarboxylic acid, sulfoterephthalic acid, 4-sulfoisophthalic acid, 2-sulfoisophthalic acid and 5-sulfoisophthalic acid. In addition, an ester-forming derivative such as a halide, acid chloride and an ester thereof may be used, which has the capability of forming an ester by reacting with another glycol component. To impart good water dispersibility or water solubility to the flame retardant polyester resin, it is preferred that the alkali metal is sodium or potassium.

In the case of using such a dicarboxylic acid component having the metal sulfonate group, the metal sulfonate group effectively remains in the water-soluble, flame retardant polyester resin, so that excellent hydrophilicity can be imparted. In particular, when using 5-sodium sulfoisophthalic acid or an ester thereof, for example, 5-Sodium sulfonate dimethyl isophthalate, a sodium sulfonate group effectively remains in the water-soluble, flame retardant polyester resin to impart excellent hydrophilicity.

In the case of imparting water dispersibility or water solubility to the flame retardant polyester resin by use of the polyvalent (trivalent or more) carboxylic acid component such as the tribasic acid anhydride and the tetrabasic acid anhydride, the condensation reaction or the polycondensation reaction for preparing the water-soluble, flame retardant polyester resin is finished such that the carboxyl group resulting from the polyvalent carboxylic acid remains in the skeleton, and then the remaining carboxyl group is neutralized by a basic compound such as ammonia, alkanolamine and alkali metal compounds. As a result, the water-soluble, flame retardant polyester resin which can be dispersed or dissolved in an aqueous solution is obtained.

As the polyvalent (trivalent or more) carboxylic acid component, for example, it is possible to use a polyvalent carboxylic acid such as hemimellitic acid, trimellitic acid, trimesic acid, mellophanic acid, pyromellitic acid, benzene pentacarboxylic acid, mellitic acid, cyclopropane-1,2,3-tricarboxylic acid, cyclopentane-1,2,3,4-tetracarboxylic acid and ethane tetracarboxylic acid. In addition, a derivative of the polyvalent carboxylic acid such as a halide, ester, acid chloride, and an anhydride thereof, which has the capability of forming an ester by reacting with the glycol component, that is, an ester-forming derivative of the polyvalent carboxylic acid may be used. To prevent, as far as possible, the formation of a 3-dimensional crosslinking of the water-soluble, flame retardant polyester resin, and allowing the carboxyl group to effectively remain after the polycondensation reaction, it is particularly preferred to use at least one of trimellitic anhydride of the tribasic acid anhydride and pyromellitic anhydride of the tetrabasic acid anhydride. In this case, the carboxyl group effectively remains in the water-soluble, flame retardant polyester resin to obtain excellent hydrophilicity.

When using such a polyvalent (trivalent or more) carboxylic acid component, particularly at least one of the tribasic acid anhydride and the tetrabasic acid anhydride, the carboxyl group effectively remains in the water-soluble, flame retardant polyester resin to obtain excellent hydrophilicity.

In addition, as the water-solubility imparting component, each of the dicarboxylic acid components having the metal sulfonate group and the polyvalent (trivalent or more) carboxylic acid components described above may be used by itself, or two or more thereof may used at the same time.

In the case of using the dicarboxylic acid component having the metal sulfonate group as the water-solubility imparting component, excellent hydrophilicity can be imparted by allowing the metal sulfonate group to effectively remain in the water-soluble, flame-retardant polyester resin. It is preferred that the amount used of the dicarboxylic acid component having the metal sulfonate group is 50 mol % or less with respect to a total amount of the dicarboxylic acid component and the water-solubility imparting component of the components used to prepare the water-soluble, flame retardant polyester resin. In this case, a particularly improved resin strength (e.g., tensile fracture strength) is obtained. In addition, when it is used as a composition for film formation, good water resistance and durability are obtained. A lower limit of the amount used of the dicarboxylic acid component having the metal sulfonate group is not restricted. For example, when the dicarboxylic acid component having the metal sulfonate group is used as the water-solubility imparting component by itself, the amount used can be 1 mol % or more, and more preferably in a range of 1 to 30 mol % with respect to the total amount of the dicarboxylic acid component and the water-solubility imparting component to maintain excellent hydrophilicity.

In addition, when using the polyvalent carboxylic acid as the water-solubility imparting component, it is preferred that the amount used is 40 mol % or less with respect to the total amount of the dicarboxylic acid component and the water-solubility imparting component. In this case, it is possible to obtain a sufficient polymerization degree under a polymerization condition of eliminating an undesired crosslinking reaction in the production process. A lower limit of the amount used of the polyvalent carboxylic acid is not restricted. For example, when using the polyvalent carboxylic acid is used as the water-solubility imparting component by itself, it is preferred that the amount used is 1 mol % or more to maintain excellent hydrophilicity. For example, when the polyvalent (trivalent or more) carboxylic acid component is used by itself, it is preferred that the amount used is in a range of 5 to 40 mol % with respect to the total amount of the dicarboxylic acid component and the water-solubility imparting component.

In addition, the total amount used of the water-solubility imparting component is in a range of 1 to 60 mol % with respect to the total amount of the dicarboxylic acid component and the water-solubility imparting component. In this range, it is possible to obtain the water-soluble, flame retardant polyester resin having sufficient water dispersibility and water solubility as well as good resin strength.

For example, as the water-solubility imparting component, when using a combination of the dicarboxylic acid having the metal sulfonate group and the polyvalent carboxylic acid such as the tribasic acid anhydride and the tetrabasic acid anhydride, the total amount used of the water-solubility imparting component is in the range of 1 to 60 mol %, and preferably 2 to 40 mol % with respect to the total amount of the dicarboxylic acid component and the water-solubility imparting component. In this range, it is possible to obtain particularly high flame resistance and durability as a composition for film formation. For example, when using the dicarboxylic acid having the metal sulfonate group and at least one of the tribasic acid anhydride and the tetrabasic acid anhydride, the metal sulfonate group and the carboxyl group are allowed to effectively remain in the water-soluble, flame-retardant polyester resin to obtain excellent hydrophilicity.

In the present specification, the aqueous solvent comprises water and a mixed solvent of water and a hydrophilic solvent. As the hydrophilic solvent, for example, it is possible to use an alcohol such as methanol, ethanol and 2-propanol, a glycol ether such as propylene glycol monomethyl ether, ethyl cellosolve and butyl cellosolve, and cyclohexane.

In the mixed solvent of water and the hydrophilic solvent, a ratio of water and the hydrophilic solvent is not restricted. In consideration of the stability of a polyester resin liquid and the safety of working environment, it is preferred that the ratio of the hydrophilic solvent in the mixed solvent is in a range of 0.1 to 50 wt %.

In the polyester resin of the present invention, when using the polyvalent carboxylic acid component as the water-solubility imparting component, for example, it becomes to be dispersible or dissoluble in the aqueous solvent by neutralizing with a basic compound such as ammonia and alkanolamine.

The reactive phosphorus-containing compound that is one of the components constructing the water-soluble, flame retardant polyester resin of the present invention can be condensed or polycondensed with at least one of the dicarboxylic acid component, glycol component and the water-solubility imparting component described above. Specifically, it is preferred to use a compound having an ester-forming functional group in the molecule.

The ester-forming functional group described above means a functional group forming an ester bonding by reacting with another carboxyl group or hydroxyl group. That is, the ester-forming functional group comprises a hydroxyl group that is the functional group forming the ester bonding by reacting with another carboxyl group, and a carboxyl group that is the functional group forming the ester bonding by reacting with another hydroxyl group. In addition, the ester-forming functional group comprises a derivative obtained by anhydrization, esterification, acid chloridization or halogenation of the carboxyl group, ester-forming derivative group of the carboxyl group forming the ester bonding by reacting with another hydroxyl group, derivative obtained by the hydroxyl group conversion to acetate, and an ester-forming derivative group of the hydroxyl group forming the ester bonding by reacting with another carboxyl group. In particular, when the reactive phosphorus-containing compound contains at least one of the ester-forming functional groups selected from the carboxyl group and the hydroxyl group, good reactivity is obtained to enhance the production efficiency of the water-soluble, flame retardant polyester resin.

In addition, it is preferred that the reactive phosphorus-containing compound has one or two of the ester-forming functional group in one molecule. In this case, it is possible to obtain the water-soluble, flame retardant polyester resin having a sufficient polymerization degree under a polymerization condition controlled to eliminate an undesired crosslinking reaction in the production process. Moreover, in the case of using the reactive phosphorus-containing compound with two ester-forming functional groups, further improved results are obtained when both of the two ester-forming functional groups are the carboxyl group or the hydroxyl group.

In consideration of easiness of reaction and excellent flame resistance, as the reactive phosphorus-containing compound described above, it is preferred to use at least one compound selected from the group of compounds represented by the following general formulas (I) to (III). In this case, the production efficiency of the water-soluble, flame retardant polyester resin is improved due to good reactivity in the production process. In addition, excellent flame resistance is obtained. To provide good weather resistance of the water-soluble, flame retardant polyester resin and excellent film stability of a resin composition prepared therefrom, it is optimum to use the compound represented by the general formula (I).

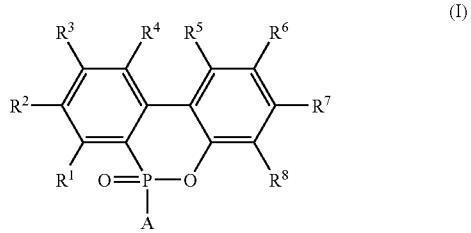

(In the formula, "$R^1$" to "$R^8$" respectively designate hydrogen atom or an organic group, which may be equal to or different from each other. In addition, "A" designates hydrogen atom or an organic group, which may be equal to or different from "$R^1$" to "$R^8$". At least one of "$R^1$" to "$R^8$" and "A" has an ester-forming functional group.)

(In the formula, "$R^9$" and "$R^{10}$" respectively designate hydrogen atom or an organic group, which may be equal to or different from each other. At least one of "$R^9$" and "$R^{10}$" has an ester-forming functional group.)

(In the formula, "$R^{11}$" to "$R^{13}$" respectively designate hydrogen atom or an organic group, which may be equal to or different from each other. At least one of "$R^{11}$" to "$R^{13}$" has an ester-forming functional group.)

It is particularly preferred that the compounds represented by the general formulas (I) to (III) have one or two of the ester-forming functional group in one molecule.

The organic group in the general formulas (I) to (III) may be an appropriate substituent. For example, it is preferably a monovalent organic group having a carbon number of 1 to 1000. The monovalent organic group comprises an aliphatic hydrocarbon group such as alkyl group and alkenyl group, alicyclic hydrocarbon group such as cyclohexyl group, aromatic hydrocarbon group such as aryl group, hydrocarbon group such as aralkyl group, carboxyl group and an alkyloxy group. In addition, these groups may have a functional group therein. For example, they may have a substituent comprising an ester-forming functional group (carboxyl group, hydroxyl group and an ester-forming derivative group derived therefrom). In this case, as described before, it is preferred that the number of the ester-forming functional group in one molecule is one or two.

In the compound represented by the general formula (I), it is also preferred that the organic group "A" has one or two of the ester-forming functional group. In addition, in the compound represented by the general formula (I), it is particularly preferred that "$R^1$" to "$R^8$" are hydrogen atoms and "A" has one or two of the hydroxyl group, carboxyl group or the ester-forming derivative group derived therefrom as the ester-forming functional group. In this case, the reactivity in the production process of the water-soluble, flame retardant polyester resin can be improved. Moreover, it is possible to achieve good weather resistance of the obtained water-soluble, flame retardant polyester resin and excellent film stability of a resin composition prepared therefrom.

As the reactive phosphorus-containing compound represented by the general formula (I), it is particularly preferred to use compounds represented by the following chemical formulas (a) to (e).

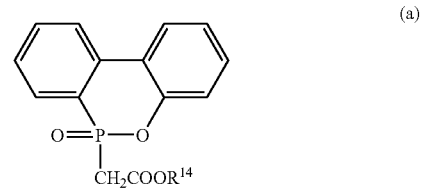

(In the formula, "$R^{14}$" designates hydrogen atom or a straight-chain or branched alkyl or alicyclic group having a carbon number of 1 to 6.)

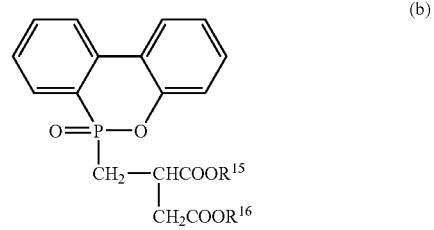

(In the formula, "$R^{15}$" and "$R^{16}$" respectively designate hydrogen atom or a straight-chain or branched alkyl or alicyclic group having a carbon number of 1 to 6. "$R^{15}$" and "$R^{16}$" may be equal to or different from each other.)

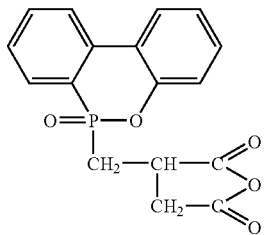
(c)

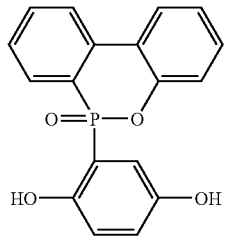
(d)

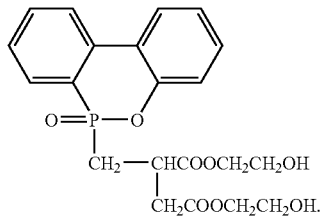
(e)

As the reactive phosphorus-containing compound represented by the general formula (II), it is particularly preferred to use compounds represented by the following chemical formulas (f) and (g).

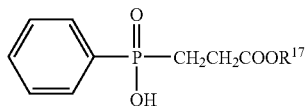
(f)

(In the formula, "$R^{17}$" designates hydrogen atom or a straight-chain or branched alkyl or alicyclic group having a carbon number of 1 to 6.)

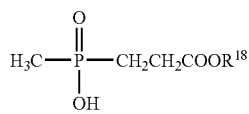
(g)

(In the formula, "$R^{18}$" designates hydrogen atom or a straight-chain or branched alkyl or alicyclic group having a carbon number of 1 to 6.)

As the reactive phosphorus-containing compound represented by the general formula (III), it is particularly preferred to use a compound represented by the following chemical formula (h).

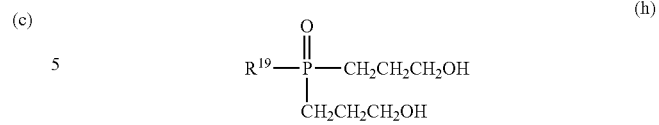
(h)

(In the formula, "$R^{19}$" designates hydrogen atom or a straight-chain or branched alkyl or alicyclic group having a carbon number of 1 to 6.)

In addition, it is preferred that the reactive phosphorus-containing compound is previously dispersed or dissolved in a monovalent alcohol such as methanol and ethanol or a bivalent alcohol such as ethylene glycol, propylene glycol and butylene glycol, and then added to the reaction system in the production process of the water-soluble, flame retardant polyester resin of the present invention.

It is also preferred that an amount used of the reactive phosphorus-containing compound is determined such that amounts of phosphorus atoms derived from the reactive phosphorus-containing compound in the obtained water-soluble, flame retardant polyester resin are 300 ppm or more, and particularly 500 ppm or more with respect to the total amount of the water-soluble, flame retardant polyester resin by weight ratio. An upper limit of the amount used of the reactive phosphorus-containing compound is not restricted. For example, it is preferably determined such that the amounts of phosphorus atoms are smaller than 100000 ppm. In this case, it is possible to obtain excellent frame resistance of the water-soluble, flame retardant polyester resin without deteriorating resin properties.

In addition, it is preferred that compounding amounts of the dicarboxylic acid component, glycol component, water-solubility imparting component and the reactive phosphorus-containing compound are determined such that a molar ratio of the total number of the carboxyl groups and the ester-forming derivative groups in the respective components: the total number of the hydroxyl groups and the ester-forming derivative groups in the respective components is in a range of 1:1 to 2.5.

In addition, it is preferred to use an appropriate amount of a conventional polyfunctional compound such as pentaerythritol, trimethylolpropane, dimethylol butanoic acid and a trifunctional carboxylic acid to control the molecular weight at the time of preparing the water-soluble, flame retardant polyester resin. When using the compound having a single functional group (ester-forming functional group) as the reactive phosphorus-containing compound, it often works as a terminal stopper. Therefore, if necessary, the polyfunctional compound described above may be used at the same time.

As an reactive component other than the above-described components, for example, p-hydroxybenzoic acid or a monovalent aliphatic alcohol may be added.

Next, an example of the production process of the water-soluble, flame retardant polyester resin of the present invention is explained. The water-soluble, flame retardant polyester resin can be produced by a first reaction that is a direct esterification reaction using dicarboxylic acid and glycol, or an ester exchange reaction between an ester-forming derivative of dicarboxylic acid and glycol, and a second reaction that is a polycondensation of this reaction product.

The following is a detail explanation of the production process comprised of the first reaction that is an ester exchange reaction between dicarboxylic acid diester and glycol, and the second reaction that is the polycondensation of the reaction product. In the first reaction, all of the reaction components can be compounded at a time. In this case, the ester exchange reaction can be performed by supplying dicarboxylic acid diester, a glycol compound and a reactive phosphorus-containing compound to a reaction vessel, and gradually heating a resultant mixture at a temperature of 150 to 260° C. in an inert-gas atmosphere such as nitrogen at normal pressures. If necessary, the reaction phosphorus-containing compound may be added at the ester polycondensation reaction.

For example, the polycondensation reaction of the second reaction can be performed at a temperature of 160 to 280° C. under a reduced pressure of 6.7 hPa (5 mmHg) or less to obtain the water-soluble, flame retardant polyester resin of the present invention. In the ester exchange reaction and the polycondensation reaction, a conventional catalyst such as titanium, stibium, zinc, magnesium, calcium, manganese and an alkali metal compound may be added at an arbitrary timing.

Specifically, when using dimethyl terephthalate (DMT) as the dicarboxylic acid component and ethylene glycol (EG) as the glycol component, bishydroxyethylene terephthalate (BHET) is generated by the ester exchange reaction (the first reaction) between DMG and EG. By performing the polycondensation (the second reaction) of this BHET, polyethylene terephthalate is obtained. The components other than the dicarboxylic acid component and the glycol component can be added at an arbitrary timing between the beginning of the first reaction and the end of the second reaction. The water-soluble, flame retardant polyester resin of the present invention may be prepared according to a conventional polyester production method other than the above process.

The water-soluble, flame retardant polyester resin of the present invention can be used in various kinds of applications. In particular, since the polyester resin is excellent in frame resistance and durability, and can be dispersed or dissolved in an aqueous solvent, it is preferably used as a resin composition for film formation. In this case, it is preferred that a number-average molecular weight of the water-soluble, flame retardant polyester resin is in a range of 5000 to 50000. When the number-average molecular weight is larger than 5000, there is an effect of sufficiently improving hydrolysis resistance in addition to excellent durability and water resistance. In addition, when the number-average molecular weight is smaller than 50000, it is possible to maintain excellent solution stability when the resin composition is dispersed or dissolved in the aqueous solvent.

In the case of using the resin composition containing the water-soluble, flame retardant polyester resin for the film formation, it is preferred that an intrinsic viscosity of the water-soluble, flame retardant polyester resin is in a range of 0.05 to 1.0 to improve long-term storage stability of the dispersion liquid or the solution as well as providing excellent frame resistance, durability and water resistance. When the intrinsic viscosity is larger than 0.05, it is possible to obtain a film having excellent strength. On the other hand, when the intrinsic viscosity is smaller than 1.0, it is possible to remarkably improve the long-term storage stability. The most suitable effect is obtained when the intrinsic viscosity is in a range of 0.12 to 0.9, and particularly 0.2 to 0.9.

Since the resin composition containing the water-soluble, flame retardant polyester resin of the present invention can be applied in a water-based system, it is preferable from the viewpoints of environment protection and working safety in the case of treating a base material with the resin composition. If necessary, an additive such as a penetrant, fire retarding material, static stopper, pigment, dye, antioxidant, UV absorbing agent, defoaming agent and a dispersing auxiliary agent may be added.

As a method of treating a fiber product with the resin composition containing the water-soluble, flame retardant polyester resin of the present invention, for example, there is a method of applying the resin composition to a cloth, knit fabric, nonwoven cloth, carpet and a web by means of dipping, padding or coating, or a method of applying the resin composition to a filiform body by use of a sizing machine according to a conventional sizing method, and then weaving the treated filiform body.

In addition, in the case of performing a surface treatment to a polyester film such as PET with the resin composition, for example, the resin composition is applied after the production of a PET film is finished. Alternatively, the resin composition may be applied to a surface of the polyester film at an appropriate timing in the conventional process of forming the PET film. In the later case, the PET film can be formed by performing a molten extrusion to a dried PET to obtain a non-drawn sheet, biaxial drawing, and then a heat treatment. In this case, the resin composition can be applied to the film surface by dipping, curtain coating, gravure coating, wire-bar method, spray coating, reverse coating, or die coating.

In addition, the resin composition containing the water-soluble, flame retardant polyester resin of the present invention can be used in various kinds of applications other than the above-described applications, for example, a coating agent for metal, glass, paper and wood, overcoating agent for electronic substrates and so on, anchor-coating agent, adhesive such as ink binder, and a surface-treatment agent for a plastic film such as polyvinyl chloride and polycarbonate.

EXAMPLES

The present invention is explained below according to Examples. However, the present invention is not restricted to those Examples. In the following description, unless otherwise specified, "parts" and "%" are based on weight. In addition, properties of polyester resins of Examples 1 to 7 and Comparative Examples 1 to 5 were measured by the following test methods.

(1) Measurement of Intrinsic Viscosity

The intrinsic viscosity was measured at 20° C. by Ostwald's viscometer under the use of o-chlorophenol as a solvent.

(2) Measurement of Number Average Molecular Weight

With respect to each of samples, a THF solution was prepared such that the solid content is 10 mg/ml, and the number average molecular weight was measured by the injection amount of 100 micro-liters under the following measuring conditions.

GPC measuring device: "SHODEX-SYSTEM 11" manufactured by SHOWA DENKO K.K.

Column: 4-series moving beds of SHODEX "KF-800P", "KF-805", "KF-803" and "KF-801" (all manufactured by SHOWA DENKO K.K.)

| | |
|---|---|
| THF Flow Amount: | 1 ml/min |
| Column Temperature: | 45° C. |

| Detector: | RI |
| Conversion: | polystyrene |

(3) Measurement of Pencil Hardness

Each of resin solutions of the Examples and the Comparative Examples was provided in a vessel for film formation, and then dried at 60° C. for 48 hours to obtain a film. In addition, front and rear surfaces of the obtained film were dried at 105° C. for 12 hours to obtain a completely dried film having the thickness of 0.4 mm. The pencil hardness of a sample obtained by keeping this completely dried film for 10 hours under the conditions of 25° C. and 55% RH was measured according to a pencil hardness testing method (JIS K 5400).

(4) Measurements of Tensile Fracture Strength and Elongation Percentage after Tensile Fracture Each of resin solutions of the Examples and the Comparative Examples was provided in a vessel for film formation, and then dried at 60° C. for 48 hours to obtain a film. In addition, front and rear surfaces of the obtained film were dried at 105° C. for 12 hours to obtain a completely dried film having the thickness of 0.4 mm. A test piece of Type Number 1 having the size of 200 mm×15 mm was prepared by using this completely dried film, and then kept for 100 hours under the conditions of 25° C. and 55% RH. Subsequently, a tensile test was performed by use of a tensile strength tester ("RTC-1225" manufactured by Orientec Co., Ltd.) according to a tensile test method (JIS K 7127) for plastic film and sheet to measure the tensile fracture strength and the elongation percentage after tensile fracture.

(5) Preparation of Test Cloth

A test cloth was prepared by treating a polyester tropical cloth with each of the resin solutions by a padding method, drying at 105° C. for 5 minutes, and performing a curing treatment at 180° C. for 2 minutes.

(6) Washing Test•Flaming Test

A washing cycle, which is defined by performing washing at 40° C. for 5 minutes under the liquor-goods ratio of 1:50 by a home electric washing machine using 2 g/l of a synthetic detergent, rinsing for 3 minutes and then spin drying, was repeated ten times (HL=10). Subsequently, with respect to each of the test cloth before the washing test (HL=0) and the test cloth after the washing test (HL=10), flammability was evaluated according to a flame contact method (JIS L 1901 D).

(7) Adhesion Test

Each of the resin solutions was applied on a PET film ("Tetoron Lumirror Type T" manufactured by Toray Industries, Inc., Thickness: 100 μm) by using a bar coater such that a film having the thickness of 5 μm is obtained after drying. After drying was performed at 150° C. for 5 minutes, aging was performed at 60° C. for 2 hours. In addition, it was kept for 10 hours under the conditions of 25° C. and 55% RH to obtain a sample. Next, crosscutting was performed to the obtained sample such that the number of grids formed in the coating layer is 100 per square inch, and then an adhesive tape peeling test was repeated three times at the same location. By counting the number of grids peeled away after the tests, the adhesion was evaluated according to the following criteria.

○: The number of grids peeled away is in a range of 0 to 10.
Δ: The number of grids peeled away is in a range of 11 to 20
×: The number of grids peeled away is larger than 21.

Example 1

242.7 parts by weight of dimethyl terephthalate, 31.1 parts by weight of dimethyl isophthalate, 59.3 parts by weight of 5-sodium sulfonate dimethyl isophthalate, 198.6 parts by weight of ethylene glycol, 18.9 parts by weight of a reactive phosphorus-containing compound represented by the above-mentioned chemical formula (e), and 0.1 parts by weight of potassium titanium oxalate as a catalyst were added to a reaction vessel. A resultant mixture was heated at 200° C. in nitrogen atmosphere at normal pressures, while being agitated. Next, the mixture was gradually heated at the reaction temperature of 260° C. over 4 hours to finish an ester exchange reaction. Subsequently, the pressure was gradually reduced at 250° C. Under the conditions of 250° C., 0.67 hPa (0.5 mmHg), a polycondensation reaction was performed for 2 hours to obtain a water-soluble, flame retardant polyester resin having the intrinsic viscosity of 0.40 and the number average molecular weight of 8200.

25 parts by weight of this water-soluble, flame retardant polyester resin, and 75 parts by weight of water were added to a dissolver, and then agitated. It was dissolved at a temperature range of 80 to 95° C. over 2 hours to obtain a 25% aqueous solution of the water-soluble, flame retardant polyester resin. By using this solution, the measurement of the pencil hardness, the tensile test and the adhesion test were carried out. In addition, the washing and flaming tests of the test cloth prepared by the above-described method were also carried out. Results are shown in Table 1.

Example 2

A water-soluble, flame retardant polyester resin was obtained according to a substantially same method as Example 1 except that the compounding amounts of dimethyl terephthalate and 5-sodium sulfonate dimethyl isophthalate are 260.2 and 29.7 parts by weight, respectively. This water-soluble, flame retardant polyester resin has the intrinsic viscosity of 0.39 and the number average molecular weight of 7900.

25 parts by weight of this water-soluble, flame retardant polyester resin, 65 parts by weight of water, and 10 parts by weight of ethylene glycol mono-t-butyl ether were added to a dissolver, and then agitated. It was dissolved at a temperature range of 80 to 95° C. over 2 hours to obtain a 25% aqueous solution of the water-soluble, flame retardant polyester resin. By using this solution, the evaluations were carried out, as in the case of Example 1. Results are shown in Table 1.

Example 3

A water-soluble, flame retardant polyester resin was obtained according to a substantially same method as Example 1 except that 299.0 parts by weight of dimethyl terephthalate, 31.1 parts by weight of dimethyl isophthalate, 161.8 parts be weight of sebacic acid, 29.7 parts by weight of 5-sodium sulfonate dimethyl isophthalate, 136.6 parts by weight of ethylene glycol, 90.1 parts by weight of 1,4-butanediol, 18.9 parts by weight of a reactive phosphorus-containing compound represented by the above-mentioned chemical formula (e), and 0.1 parts by weight of potassium titanium oxalate as a catalyst were added to the reaction vessel. This water-soluble, flame retardant polyester resin has the intrinsic viscosity of 0.37 and the number average molecular weight of 8000. 25 parts by weight of this water-soluble, flame retardant polyester resin, 65 parts by weight of water, and 10 parts by weight of ethylene glycol mono-t-butyl ether were added to the dissolver, and then agitated. It was dissolved at a temperature range of 80 to 95° C. over 2 hours to obtain a 25% aqueous solution of the water-soluble, flame retardant polyester resin. By using this solution, the evaluations were carried out, as in the case of Example 1. Results are shown in Table 1.

Example 4

217.5 parts by weight of dimethyl terephthalate, 31.1 parts by weight of dimethyl isophthalate, 136.6 parts by weight of ethylene glycol, 90.1 parts by weight of 1,4-butanediol, 18.9 parts by weight of a reactive phosphorus-containing compound represented by the above-mentioned chemical formula (e), and 0.1 parts by weight of potassium titanium oxalate as a catalyst were added to a reaction vessel. A resultant mixture was heated at 200° C. in nitrogen atmosphere at normal pressures, while being agitated. Next, the mixture was gradually heated at the reaction temperature of 260° C. over 4 hours to finish an ester exchange reaction, and then 61.5 parts by weight of trimellitic anhydride were added. Subsequently, the pressure was gradually reduced at 250° C. Under the conditions of 250° C., 0.67 hPa (0.5 mmHg), a polycondensation reaction was performed for 30 minutes to obtain a water-soluble, flame retardant polyester resin having the acid value of 50.2, the intrinsic viscosity of 0.37 and the number average molecular weight of 7700.

25 parts by weight of this water-soluble, flame retardant polyester resin, 68.7 parts by weight of water, 5 parts by weight of ethylene glycol mono-t-butyl ether, and 1.3 parts by weight of a 25% aqueous ammonia were added to a dissolver, and then agitated. It was dissolved at a temperature range of 80 to 95° C. over 2 hours to obtain a 25% aqueous solution of the water-soluble, flame retardant polyester resin. By using this solution, the evaluations were carried out, as in the case of Example 1. Results are shown in Table 1.

Example 5

A water-soluble, flame retardant polyester resin was obtained according to a substantially same method as Example 4 except that the compounding amounts of dimethyl terephthalate and 5-sodium sulfonate dimethyl isophthalate are 211.7 and 8.9 parts by weight, respectively. This water-soluble, flame retardant polyester resin has the acid value of 47.1, the intrinsic viscosity of 0.38 and the number average molecular weight of 7600. 25 parts by weight of this water-soluble, flame retardant polyester resin, 68.8 parts by weight of water, and 1.2 parts by weight of a 25% aqueous ammonia were added to the dissolver, and then agitated. It was dissolved at a temperature range of 80 to 95° C. over 2 hours to obtain a 25% aqueous solution of the water-soluble, flame retardant polyester resin. By using this solution, the evaluations were carried out, as in the case of Example 1. Results are shown in Table 1.

Example 6

A water-soluble, flame retardant polyester resin was obtained according to a substantially same method as Example 1 except that 242.7 parts by weight of dimethyl terephthalate, 31.1 parts by weight of dimethyl isophthalate, 59.3 parts by weight of 5-sodium sulfonate dimethyl isophthalate, 162.6 parts by weight of ethylene glycol, 43.3 parts by weight of 1,4-butanediol, 13.4 parts by weight of trimethylolpropane, 4.2 parts by weight of a reactive phosphorus-containing compound represented by the above-mentioned chemical formula (i), and 0.1 parts by weight of potassium titanium oxalate as the catalyst were added to the reaction vessel. This water-soluble, flame retardant polyester resin has the intrinsic viscosity of 0.39 and the number average molecular weight of 8100. 25 parts by weight of this water-soluble, flame retardant polyester resin and 75 parts by weight of water were added to the dissolver, and then agitated. It was dissolved at a temperature range of 80 to 95° C. over 2 hours to obtain a 25% aqueous solution of the water-soluble, flame retardant polyester resin. By using this solution, the evaluations were carried out, as in the case of Example 1. Results are shown in Table 1.

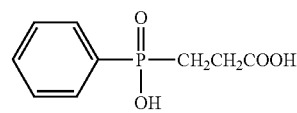

(i)

Example 7

A phosphorus-containing polyester resin was obtained according to a substantially same method as Example 1 except for replacing 18.9 parts by weight of the reactive phosphorus-containing compound represented by the chemical formula (e) with 9.7 parts by weight of a reactive phosphorus-containing compound represented by the following chemical formula (j). This phosphorus-containing polyester resin has the intrinsic viscosity of 0.40 and the number average molecular weight of 8600. 25 parts by weight of this phosphorus-containing polyester resin and 75 parts by weight of water were added to the dissolver, and then agitated. It was dissolved at a temperature range of 80 to 95° C. over 2 hours to obtain a 25% aqueous solution of the phosphorus-containing polyester resin. By using this solution, the evaluations were carried out, as in the case of Example 1. Results are shown in Table 1.

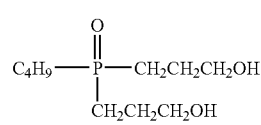

(j)

Comparative Example 1

A water-soluble polyester resin was obtained according to a substantially same method as Example 1 except for not using the reactive phosphorus-containing compound. This water-soluble polyester resin has the intrinsic viscosity of 0.40 and the number average molecular weight of 8000. 25 parts by weight of this water-soluble polyester resin and 75 parts by weight of water were added to the dissolver, and then agitated. It was dissolved at a temperature range of 80 to 95° C. over 2 hours to obtain a 25% aqueous solution of the water-soluble polyester resin. By using this solution, the evaluations were carried out, as in the case of Example 1. Results are shown in Table 1.

Comparative Example 2

A water-soluble polyester resin was obtained according to a substantially same method as Example 4 except for not using the reactive phosphorus-containing compound. This water-soluble polyester resin has the acid vale of 49.6, the intrinsic viscosity of 0.38 and the number average molecular weight of 7800. 25 parts by weight of this water-soluble polyester resin, 68.9 parts by weight of water, 5 parts by weight of ethylene glycol mono-t-butyl ether, and 1.1 parts by weight of a 25% aqueous ammonia were added to the dissolver, and then agitated. It was dissolved at a temperature range of 80 to 95° C. over 2 hours to obtain a 25% aqueous solution of the water-soluble polyester resin. By using this solution, the evaluations were carried out, as in the case of Example 1. Results are shown in Table 1.

Comparative Example 3

A phosphorus-containing polyester resin was obtained according to a substantially same method as Example 1 except that the compounding amount of dimethyl isophthalate is 281.6 parts by weight, and 5-sodium sulfonate dimethyl isophthalate was not used. This phosphorus-containing polyester resin has the intrinsic viscosity of 0.41 and the number average molecular weight of 8300. This phosphorus-containing polyester resin is insoluble in water or a mixed solvent of water and a hydrophilic solvent. In addition, it was tried to dissolve it in each of toluene and xylene as general solvents. However, no stable solution was obtained. On this account, 20 parts by weight of this phosphorus-containing polyester resin, 20 parts by weight of ethyl acetate and 60 parts by weight of o-chlorophenol were added to the dissolver, and then agitated. It was dissolved at 75° C. for 2 hours to obtain a 20% solution of the phosphorus-containing polyester resin. By using this solution, the evaluations were carried out, as in the case of Example 1. Results are shown in Table 1. At the time of preparing the test cloth, a discoloration occurred by the influence of the solvent in the polyester resin solution. In addition, the obtained cloth showed insufficient planarity and poor dimensional stability.

Comparative Example 4

A phosphorus-containing polyester resin was obtained according to a substantially same method as Comparative Example 3 except that the polycondensation reaction was performed for 30 minutes under the conditions of 250° C., 0.67 hPa (0.5 mmHg). This phosphorus-containing polyester resin has the intrinsic viscosity of 0.09 and the number average molecular weight of 3800. This phosphorus-containing polyester resin is insoluble in water or a mixed solvent of water and a hydrophilic solvent. 25 parts by weight of this phosphorus-containing polyester resin, 60 parts by weight of toluene and 15 parts by weight of methyl ethyl ketone were added to the dissolver, and then agitated. It was dissolved at 75° C. for 2 hours to obtain a 25% solution of the phosphorus-containing polyester resin. By using this solution, the evaluations were carried out, as in the case of Example 1. Results are shown in Table 1.

Comparative Example 5

60 parts by weight of the aqueous solution of the water-soluble polyester resin obtained in Comparative Example 1, 25 parts by weight of NON-NEN R-49 (manufactured by MARUBISHI OIL CHEMICAL CO., LTD., water-soluble, phosphorous-based flame retardant), and 15 parts by weight of water were added to obtain a 25% aqueous solution of a nonvolatile component. By using this solution, the evaluations were carried out, as in the case of Example 1. Results are shown in Table 1.

As understood from the above results, the films having excellent flame resistance and good film properties were obtained in Examples 1 to 7. In Example 3, the pencil hardness and the tensile fracture strength are lower than the remaining Examples. It is because sebacic acid was used at the time of preparing the water-soluble, flame retardant polyester resin to intentionally improve the flexibility of the film. As a result, the elongation percentage after tensile fracture was remarkably improved in Example 3.

In Comparative Examples 1 and 2, the film properties were substantially the same as them of Examples 1 and 4. However, since the reactive phosphorous containing compound was not used in these Comparative Examples, the flame resistance was poor. On the other hand since the water-solubility imparting component was not used in Comparative Example 3, the obtained polyester resin could not be dispersed or dissolved in an aqueous solvent. In addition, even when using the general solvents, a suitable solution could not be obtained. Moreover, even when the resin composition was prepared by using ethyl acetate and o-chlorophenol, the film having sufficient adhesion was not obtained.

In Comparative Example 4 performed under a different condition of the polycondensation reaction from Comparative Example 3, the obtained polyester resin could not be dispersed or dissolved in an aqueous solvent. In the case of using a general solvent, a solution was obtained. However, the tensile fracture strength of the film considerably lowered, and the flame resistance slightly deteriorated. In addition, it showed poor adhesion.

In Comparative Example 5 using the addition-type, water-soluble, phosphorous-based flame retardant in place of the reactive phosphorous containing compound, the tensile fracture strength of the film considerably lowered. In addition, the flame resistance and the adhesion deteriorated.

INDUSTRIAL APPLICABILITY

According to the water-soluble, flame retardant polyester resin of the present invention, since a solubility in aqueous solvent is imparted to a halogen-free, phosphorus-containing polyester with excellent flame resistance, an improved applicability can be provided. In addition, it is possible to eliminate problems of poor working environment and environmental destruction resulting from organic solvents. Furthermore, even when it is used to treat worked substrates such as fibers and PET films, deteriorations of the worked substrates can be prevented.

In addition, according to the resin composition containing the water-soluble, flame retardant polyester resin of the present invention, since a film having excellent flame resistance can be formed, it is preferably used for film formation, and particularly resin finishing of fiber products to provide excellent flame resistance and fire resistance to the fibers to be treated. Moreover, when using the resin composition in a surface treatment of polyester films, it is possible to obtain the polyester films with excellent flame resistance and fire resistance. Therefore, the fiber products treated by the resin composition containing the water-soluble, flame-retardant polyester resin of the present invention have the film of the resin composition with excellent flame resistance and good film properties.

Thus, according to the present invention, there are many advantages of allowing the polyester resin to have excellent flame resistance, while maintaining the original properties of the polyester resin, eliminating the problems of poor working environment and environmental destruction caused by using organic solvents, and preventing deteriorations of objects to be treated. Therefore, the present invention is valuable in industrial applications.

wherein, in the formula II, "$R^9$" and "$R^{10}$" respectively designate hydrogen atom or an organic group, which may be equal to or different from each other, but at least one of "$R^9$" and "$R^{10}$" has an ester-forming functional group,

TABLE 1

|  |  | Examples |  |  |  |  |  |  | Comparative Examples |  |  |  |  |
|---|---|---|---|---|---|---|---|---|---|---|---|---|---|
|  |  | 1 | 2 | 3 | 4 | 5 | 6 | 7 | 1 | 2 | 3 | 4 | 5 |
| Pencil Hardness |  | 4 H | 4 H | B | 2 H | 2 H | 2 H | HB | 4 H | 2 H | 4 H | HB | 2 B |
| Tensile Test | Tensile Fracture Strength ($\times 10^3$ N/cm$^2$) | 2.94 | 3.04 | 0.88 | 2.16 | 2.35 | 3.04 | 2.45 | 2.84 | 2.06 | 2.84 | 0.49 | 0.35 |
|  | Tensile Fracture Elongation (%) | 39 | 37 | 480 | 45 | 42 | 40 | 51 | 40 | 48 | 43 | 35 | 50 |
| Washing · Flaming Tests | HL = 0 | 5 | 5 | 5 | 5 | 5 | 5 | 5 | 1 | 1 | 5 | 5 | 5 |
|  | HL = 10 | 5 | 5 | 5 | 5 | 5 | 5 | 5 | 1 | 1 | 5 | 4 | 2 |
| Adhesion |  | ○ | ○ | ○ | ○ | ○ | ○ | ○ | ○ | ○ | Δ | X | X |

The invention claimed is:

1. A water-soluble, flame retardant polyester resin prepared by a condensation reaction or a polycondensation reaction of a dicarboxylic-acid component, a glycol component, a water-solubility imparting component and a reactive phosphorus-containing compound such that a ratio of the water-solubility imparting component in a total of the dicarboxylic-acid component and the water-solubility imparting component is in a range of 5 to 40 mol,
wherein the water-solubility imparting component consists of at least one of a tribasic acid anhydride and a tetrabasic acid anhydride, and
wherein the reactive phosphorus-containing compound is at least one selected from compounds represented by the following general formulas (I) (II) and (III):

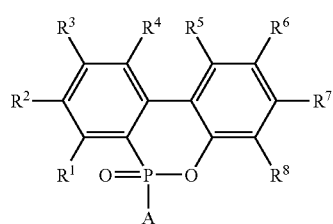

wherein, in the formula I, "$R^1$" to "$R^8$" respectively designate hydrogen atom or an organic group, which may be equal to or different from each other, "A" designates hydrogen atom or an organic group, which may be equal to or different from "$R^1$" to "$R^8$", but at least one of "$R^1$" to "$R^8$" and "A" has an ester-forming functional group,

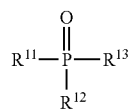

wherein, in the formula III, "$R^{11}$" to "$R^{13}$" respectively designate hydrogen atom or an organic group, which may be equal to or different from each other, but at least one of "$R^{11}$" to "$R^{13}$" has an ester-forming functional group.

2. The water-soluble, flame retardant polyester resin as set forth in claim 1, wherein amounts of phosphorus atoms derived from the reactive phosphorus-containing compound are in a range of 300 to 100000 ppm.

3. The water-soluble, flame retardant polyester resin as set forth in claim 1, wherein the reactive phosphorus-containing compound has at least one ester-forming functional group selected from a carboxyl group and a hydroxyl group.

4. The water-soluble, flame retardant polyester resin as set forth in claim 1, wherein the water-solubility imparting component comprises at least one of trimellitic anhydride of a tribasic acid anhydride and pyromellitic dianhydride of a tetrabasic acid anhydride.

5. A resin composition containing the water-soluble, flame retardant polyester resin as set forth in claim 1.

6. The resin composition as set forth in claim 5 prepared for fiber processing.

7. The resin composition as set forth in claim 5 prepared for a surface treatment of polyester films.

8. A fiber product treated by use of the resin composition as set forth in claim 5.

9. The water-soluble, flame retardant polyester resin as set forth in claim 1, wherein the reactive phosphorus-containing compount represented by the general formula (I) is selected from compounds represented by the following chemical formulas (a) to (e)

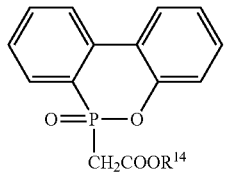
(a)

wherein, in the formula "a", "$R^{14}$" designates hydrogen atom or a straight-chain or branched alkyl or alicyclic group having a carbon number of 1 to 6,

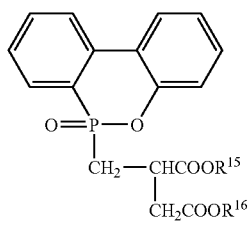
(b)

wherein, the formula "b", "$R^{15}$"and $R^{16}$" respectively designate hydrogen atom or a straight-chain or branched alkyl or alicyclic group having a carbon number of 1 to 6, "$R^{15}$" and "$R^{16}$" may be equal to or different from each other,

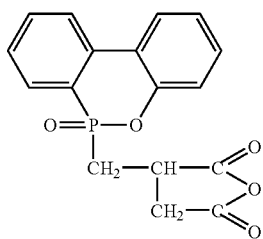
(c)

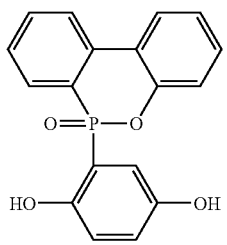
(d)

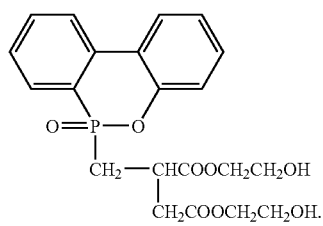
(e)

10. The water-soluble, flame retardant polyester resin as set forth in claim 1, wherein the reactive phosphorus-containing compound represented by the general formula (II) is selected from compounds represented by the following chemical formulas (f) and (g),

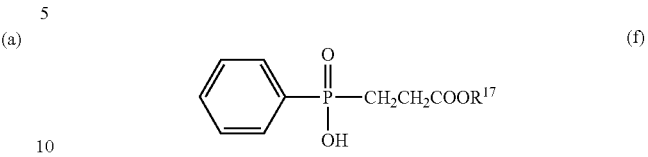
(f)

wherein, in the formula "f", "$R^{17}$" designates hydrogen atom or a straight-chain or branched alkyl or alicyclic group having a carbon number of 1 to 6,

(g)

wherein, in the formula "g", "$R^{18}$" designates hydrogen atom or a straight-chain or branched alkyl or alicyclic group having a carbon number of 1 to 6.

11. The water-soluble, flame retardant polyester resin as set forth in claim 1, wherein the reactive phosphorus-containing compound represented by the general formula (III) is represented by the following chemical formula (h)

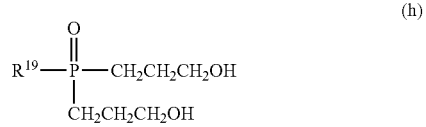
(h)

wherein, in the formula "h", "$R^{19}$" designates hydrogen atom or a straight-chain or branched alkyl or alicyclic group having a carbon number of 1 to 6.

12. The water-soluable, flame retardant polyester resin as set forth in claim 1, wherein compounding amounts of the dicarboxylic acid component, glycol component, water-solubility imparting component and the reactive phosphorus-containing compound are determined such that a molar ratio of a total number of carboxyl groups and the ester-forming derivative groups in the respective components : a total number of hydroxyl groups and the ester-forming derivative groups in the respective components is in a range of 1 : 1 to 2.5.

13. The water-soluable, flame retardant polyester resin as set forth in claim 1, wherein a number-average molecular weight of the water-soluble, flame retardant polyester resin is in a range of 5000 to 50000.

14. The water-soluble, flame retardant polyester resin as set forth in claim 1, wherein an intrinsic viscosity of the water-soluble, flame retardant polyester resin is in a range of 0.05 to 1.0.

15. The water-soluble, flame retardant polyester resin as set forth in claim 14, wherein the intrinsic viscosity is in a range of 0.12 to 0.9.

16. The water-soluble, flame retardant polyester resin as set forth in claim 14, wherein the intrinsic viscosity is in a range of 0.2 to 0.9.

* * * * *